Jan. 9, 1923.
C. F. KETTERING.
HYDROMETER CIRCUIT CLOSER.
FILED DEC. 19, 1916.
1,441,430.
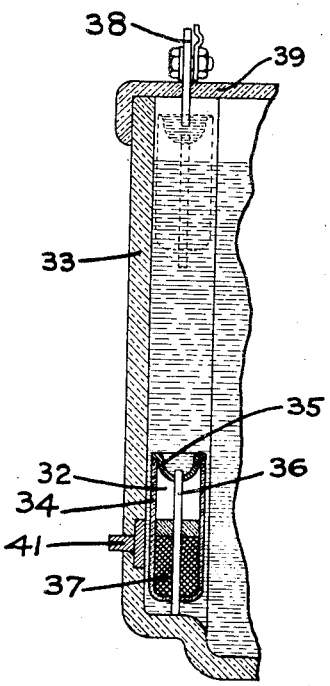

Patented Jan. 9, 1923.

1,441,430

UNITED STATES PATENT OFFICE.

CHARLES F. KETTERING, OF DAYTON, OHIO, ASSIGNOR, BY MESNE ASSIGNMENTS, TO DELCO-LIGHT COMPANY, OF DAYTON, OHIO, A CORPORATION OF DELAWARE.

HYDROMETER CIRCUIT CLOSER.

Application filed December 19, 1916. Serial No. 137,884.

*To all whom it may concern:*

Be it known that I, CHARLES F. KETTERING, a citizen of the United States of America, residing at Dayton, county of Montgomery, and State of Ohio, have invented certain new and useful Improvements in Hydrometer Circuit Closers, of which the following is a full, clear, and exact description.

This invention relates to an improvement in hydrometer circuit closers and more particularly to that type of hydrometer circuit closer employed in storage batteries, wherein the charging is controlled by the condition of the battery electrolyte.

One of the objects of the present invention is to provide an indicating device and circuit closer operated in accordance with the density of the battery electrolyte, wherein an electrical circuit is made by means of a metallic and a liquid contact, so that the opening and closing of this circuit is accomplished without undue arcing.

Further objects and advantages of the present invention will be apparent from the following description, reference being had to the accompanying drawing, wherein a preferred embodiment of the present invention is clearly set forth.

Referring to the drawing, the single figure discloses a sectional view of a portion of a battery, showing the detailed construction of the device controlled by the density of the battery electrolyte.

Numeral 33 indicates a battery cell containing the battery electrolyte and adapted to be buoyantly supported by the electrolyte is an indicating or hydrometer element 32. This indicating element 32, as is shown in full lines in the figure, comprises a body portion 34 having a cup-shaped cover 35. This cup-shaped cover 35, as well as the body portion 34, may be made up of any suitable material not affected by the electrolyte.

The indicating element also constitutes the movable element of the circuit closer, and for this purpose a stem or conductor 36 is secured to the indicating element, said conductor or stem portion having one extremity projecting through the cup-shaped cover 35, while the other extremity projects through the bottom of the body portion 34.

Any suitable ballasting material 37 may be provided within the indicating element 32.

A stationary contact element 38 is secured to the top 39 of the battery cell 33, said stationary contact element projecting through the cover 39 and situated directly in alignment with the cup-shaped cover 35 of the indicator 32, so that when said indicating element is buoyantly supported by the electrolyte within the battery cell, as shown by the dotted lines, the portion of the stationary contact 38 which projects through the battery cover 39, will tend to engage with and dip into the liquid lifted up and contained within the cup-shaped cover of the indicating device.

A conducting member 41 is mounted in the side wall of the battery cell with its inner end in contact with the electrolyte and its outer end projecting beyond the outer surface of the wall and forming a terminal.

Contacts 41 and 38 are the terminals by which the hydrometer circuit closer may be connected in the circuit which it is desired to control. The device illustrated is adapted particularly to be used in connection with the control circuits of an engine-driven battery-charging system. When the battery is discharged the indicating element 32 is in its lowest position as shown in full dotted lines in the figure. During the charging operation the specific gravity of the electrolyte increases causing the indicating element to rise to its highest position as shown in dotted lines in the figure, thereby closing the circuit through the terminal 41, electrolyte, conductor 36 and element 38 to short-circuit the ignition circuit of the engine or to operate other control circuits whereby the charging of the battery is discontinued. Upon discharge of the battery the indicating element 32 recedes from the contact element 38 and the circuit is again broken. It will be noted that the small quantity of electrolyte carried in the cup-shaped cover 35 effectively suppresses any arc which might tend to form between the conductor 36 and the contact element 38.

While the hydrometer circuit closer has been described in connection with the control circuit of a battery charging system, it should be understood that it may be used in any other circuit which is to be controlled by the condition of the battery electrolyte. It is also clear that this invention may be used with other liquids than the one described and is capable of numerous applications wherein it is desired to control a circuit by the variation in specific gravity of a liquid.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What I claim is as follows:

1. In combination with a container containing a liquid, a hydrometer circuit closer comprising a terminal in contact with the liquid; a second terminal entirely above the surface of the liquid; and a completely submersible conducting hydrometer element adapted to rise into contact with the second-mentioned terminal.

2. In combination with a container containing a liquid, a hydrometer circuit closer comprising a terminal in contact with the liquid; a second terminal entirely above the surface of the liquid; and a completely submersible conducting hydrometer element adapted to rise into contact with the second-mentioned terminal, said hydrometer element being formed at its upper end with a depression adapted to contain arc-suppressing material.

3. In combination with a container containing a liquid, a hydrometer circuit closer comprising a terminal in contact with the liquid; a second terminal entirely above the surface of the liquid; and a hydrometer element having a conducting member extending therethrough, the hydrometer element being adapted to rise and carry the conducting member into electrical contact with the second-mentioned terminal.

4. In combination with a container containing a liquid; a hydrometer circuit closer comprising a terminal in contact with the liquid; a second terminal above the surface of the liquid; and a hydrometer element having a depression in its upper surface and comprising a conducting member extending into the depression and making contact at all times with the liquid below the hydrometer element, the hydrometer element being adapted to rise and carry the conducting member into contact with the second-mentioned terminal.

5. In combination with a container containing a liquid, a hydrometer circuit closer comprising a terminal in contact with the liquid; a second terminal above the surface of the liquid; and a hydrometer element having a depression in its upper surface adapted to carry arc-suppressing material and comprising a conducting member extending into the depression and making contact at all times with the liquid below the hydrometer element, the hydrometer element being adapted to rise and carry the conducting member into contact with the second-mentioned terminal.

6. In combination with a container containing a liquid, a hydrometer circuit closer comprising a terminal in contact with the liquid; a second terminal above the surface of the liquid; and a hydrometer element having a depression in its upper surface adapted to carry arc-suppressing material; a conducting member extending through the hydrometer element from the depression to a point at all times submerged in the liquid, the hydrometer element being adapted to rise and carry the conducting member into contact with the second-mentioned terminal.

7. In combination with a container containing a liquid; a hydrometer circuit closer comprising a single terminal in fixed position above the surface of the liquid and a completely submersible conducting hydrometer element adapted to rise into electrical contact with said terminal and adapted to thereby close a circuit.

8. In combination with a container containing a liquid; a hydrometer circuit closer comprising a single terminal in fixed position above the surface of the liquid and a completely submersible conducting hydrometer element adapted to rise into electrical contact with said terminal and adapted to thereby close a circuit, said hydrometer element being formed with a cup-shaped depression adapted to carry a quantity of the liquid into contact with said terminal.

In testimony whereof I affix my signature in the presence of two subscribing witnesses.

CHARLES F. KETTERING.

Witnesses:
J. W. McDonald,
Walter W. Riedel.